(12) United States Patent
Pellegrini

(10) Patent No.: US 11,040,494 B2
(45) Date of Patent: Jun. 22, 2021

(54) METHOD AND DEVICE FOR PRODUCING A PACK FOR PREPARING FOOD OR BEVERAGE PRODUCTS

(71) Applicant: SOCIETE DES PRODUITS NESTLE S.A., Vevey (CH)

(72) Inventor: Stephane Pellegrini, Montperreux (FR)

(73) Assignee: Societe des Produits Nestle S.A., Vevey (CH)

( * ) Notice: Subject to any disclaimer, the term of this patent is extended or adjusted under 35 U.S.C. 154(b) by 154 days.

(21) Appl. No.: 16/480,390

(22) PCT Filed: Jan. 31, 2018

(86) PCT No.: PCT/EP2018/052380
§ 371 (c)(1),
(2) Date: Jul. 24, 2019

(87) PCT Pub. No.: WO2018/141782
PCT Pub. Date: Aug. 9, 2018

(65) Prior Publication Data
US 2019/0381746 A1    Dec. 19, 2019

(30) Foreign Application Priority Data

Feb. 6, 2017   (EP) ..................................... 17154780

(51) Int. Cl.
*B29C 65/18*  (2006.01)
*B29C 65/00*  (2006.01)
(Continued)

(52) U.S. Cl.
CPC .......... *B29C 66/4332* (2013.01); *B29C 65/18* (2013.01); *B29C 65/7802* (2013.01);
(Continued)

(58) Field of Classification Search
CPC ......... B65D 75/20; B29C 65/18; B29C 65/20; B29C 66/4332; B29C 66/849;
(Continued)

(56) References Cited

U.S. PATENT DOCUMENTS 3,765,144 A * 10/1973 Schiesser ................ B29C 57/10
53/412
4,004,399 A *  1/1977 Borrello .................. B29C 65/18
53/554

(Continued)

FOREIGN PATENT DOCUMENTS

| GB | 2293134   | 3/1996  |
|----|-----------|---------|
| WO | 2004101374 | 11/2004 |
| WO | 2014125123 | 8/2014  |

*Primary Examiner* — Scott W Dodds
(74) *Attorney, Agent, or Firm* — K&L Gates LLP

(57) ABSTRACT

The invention relates to a method for wrapping and sealing a flexible sheet over an insert (10) to produce a pack (100) for preparing a food or beverage product from one or more ingredients; the pack comprising an insert (10) and a container (20) made from the flexible sheet folded to store the one or more ingredients, the flexible sheet being arranged overwrapping and matching the shape of the insert (10) in its entirety except for the part of the insert (10) in direct communication with the inner volume of the container (20); the method comprising the following steps: —holding the insert (10) so that it is substantially perpendicular with respect to the flexible sheet; —moving the insert (10) towards the flexible sheet, until it touches a bottom sealing tool (210); —moving at least two side sealing tools (220, 230) towards the insert (10); —applying by the bottom sealing tool (210) and by the side sealing tools (220, 230) a certain required pressure and temperature to achieve a tight sealing of the flexible sheet over the entirety of the insert (10) except for the part of it in direct communication with the inner volume of the container (20). The invention further (Continued)

relates to a device (200) for wrapping and sealing a flexible sheet over an insert (10) to produce a pack (100) for preparing a food or beverage product from one or more ingredients.

10 Claims, 6 Drawing Sheets

(51) Int. Cl.
| | |
|---|---|
| *B29C 65/78* | (2006.01) |
| *B65B 29/02* | (2006.01) |
| *B65B 43/02* | (2006.01) |
| *B65D 75/20* | (2006.01) |
| *B65D 75/58* | (2006.01) |
| *B65D 85/804* | (2006.01) |
| *A47J 31/40* | (2006.01) |
| *B29L 31/00* | (2006.01) |

(52) U.S. Cl.
CPC ........ *B29C 65/7841* (2013.01); *B29C 66/474* (2013.01); *B29C 66/8322* (2013.01); *B65B 29/02* (2013.01); *B65B 43/02* (2013.01); *B65D 75/20* (2013.01); *B65D 75/5872* (2013.01); *B65D 85/8043* (2013.01); *A47J 31/407* (2013.01); *B29L 2031/7174* (2013.01)

(58) Field of Classification Search
CPC ......... B65B 47/04; B65B 47/06; B65B 43/02; B65B 11/48; B65B 2051/105
See application file for complete search history.

(56) References Cited

U.S. PATENT DOCUMENTS

| | | | |
|---|---|---|---|
| 4,710,157 A | 12/1987 | Posey | |
| 2002/0112449 A1* | 8/2002 | Heath | ..................... B65B 47/04 53/440 |
| 2020/0017248 A1* | 1/2020 | Dahlmanns | ......... B29C 66/3452 |

* cited by examiner

METHOD AND DEVICE FOR PRODUCING A PACK FOR PREPARING FOOD OR BEVERAGE PRODUCTS

CROSS REFERENCE TO RELATED APPLICATIONS

The present application is a National Stage of International Application No. PCT/EP2018/052380, filed on Jan. 31, 2018, which claims priority to European Patent Application No. 17154780.5, filed on Feb. 6, 2017, the entire contents of which are being incorporated herein by reference.

FIELD OF THE INVENTION

The present invention relates to a method for manufacturing a pack for preparing food or beverage products, the pack comprising a flexible sheet configuring a container and an insert through which fluid is introduced in the container to prepare the corresponding food or beverage product. The invention further relates to a device for producing such a pack using the mentioned method.

BACKGROUND OF THE INVENTION

Preparing beverages by introducing a capsule containing a food or beverage ingredient, such as ground coffee or instant coffee, in a beverage dispensing machine and injecting water into the capsule is known in the state of the art: the beverage or food ingredient is typically extracted or dissolved into water to form the beverage or the desired final product, which flows out of the capsule through a suitable outlet.

As such, different capsules have been developed in the past, these capsules being at least differentiated by the nature of the capsule body used for storing the food or the beverage ingredient. Whereas most of the capsules are made of a rigid body or semi-rigid body, typically made though injection moulding or thermoforming, flexible types of packs can be made out of foil materials. Flexible packs have generally the advantage to semi-rigid and rigid capsules that less amount of material is used to pack the product leading to overall less production cost, to lower life cycle impact shown in several life-cycle assessments and to advantages on the part of the user, who will need less available space for storing these packs, as they are more compact.

Flexible pouches or sachets are known in the prior art, such as for example in document WO 99/05044 or in WO 2011/024103, comprising an inlet through which water is introduced to prepare the beverage, and an outlet through which the prepared product is dispensed. However, in these documents of the known prior art, neither the water inlet nor the beverage outlet are closed by a membrane, which is not recommended in terms of hygiene and shelf life as it could present problems to the consumer. Moreover, in these known systems, the insert or spout represents a weak point as it is typically made of plastics material such as PE or PP which does not form a barrier for oxygen. By the way the spout is typically sealed with the flexible container or sachet, there are points or paths allowing oxygen to enter the inside of the container, therefore accessing the product stored in it, which represents a weak point from hygienic point of view.

European Patent application number EP 16155317.7 discloses a pack for preparing food or beverage products where the flexible sheet making the container is arranged overwrapping and matching the shape of the insert in its entirety except for the part of the insert in direct communication with the inner volume of the container, in such a way to configure a tightly sealed and hygienic pack. In order to perfectly match the shape of the insert and to seal tightly the sheet over it, several steps could be envisaged, thus making the process complicated, costly and needing several different devices to achieve it. The object of the present invention is therefore to provide a method for making this tight over-wrapping in an easy, quick, not costly and efficient way.

Therefore, it is an object of the present invention to provide a solution to the above-described needs, as it will be further explained. The invention also aims at other objects and particularly at the solution of other problems as will appear in the rest of the present description.

SUMMARY OF THE INVENTION

According to a first aspect, the invention refers to a method for wrapping and sealing a flexible sheet over an insert to produce a pack for preparing a food or beverage product from one or more ingredients. The pack comprises an insert and a container made from the flexible sheet folded to store the one or more ingredients, the flexible sheet being arranged overwrapping and matching the shape of the insert in its entirety except for the part of the insert in direct communication with the inner volume of the container. The method of the invention comprises the following steps:
  holding the insert so that it is substantially perpendicular with respect to the flexible sheet;
  moving the insert towards the flexible sheet, until it touches a bottom sealing tool;
  moving at least two side sealing tools towards the insert;
  applying by the bottom sealing tool and by the side sealing tools a certain required pressure and temperature to achieve a tight sealing of the flexible sheet over the entirety of the insert except for the part of it in direct communication with the inner volume of the container.

Preferably, in the method of the invention, the sealing parameters are one or a combination of: time and/or pressure and/or temperature. Typically, the insert is held substantially transversally, the side sealing tools facing both longitudinal sides of the insert.

The method of the invention preferably further comprises the step of closing the ends of the flexible sheet by application of pressure and temperature in order to form a closed container inside the volume of which the ingredients are stored.

According to a second aspect, the invention refers to a device for wrapping and sealing a flexible sheet over an insert to produce a pack for preparing a food or beverage product from one or more ingredients, the pack comprising an insert and a container made from the flexible sheet folded to store the one or more ingredients, the device comprising:
  film guiding means configured to position the flexible sheet substantially perpendicular with respect to the insert;
  sealing means configured to have complementary shapes to the shapes of the insert in its entirety except for the part of the insert in direct communication with the inner volume of the container, the sealing means being further configured to apply certain required pressure and temperature values to achieve a tight sealing of the flexible sheet over the insert in its entirety except for its part in direct communication with the inner volume of the container, the sealing means comprising a bottom sealing tool and at least two lateral sealing tools.

In the device of the invention, the film guiding means and the sealing means are preferably synchronized in such a way that, as the insert moves downwards and is wrapped by the flexible sheet, the sealing means come to seal tightly the insert in its entirety except for the part of it in direct communication with the inner volume of the container.

Typically, the device of the invention further comprises an insert support configured to hold the insert in a substantially vertical position, and guiding it downwards substantially vertically to be wrapped around the flexible sheet.

Preferably, the device is configured as a single unit, operating in an automatic way.

The device according to the present invention is preferably configured by the design of the sealing means and their relative positioning with respect to the insert.

In the device of the invention, the sealing means are typically configured having a substantially constant distance in any of their transversal directions along their longitudinal axis.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1:
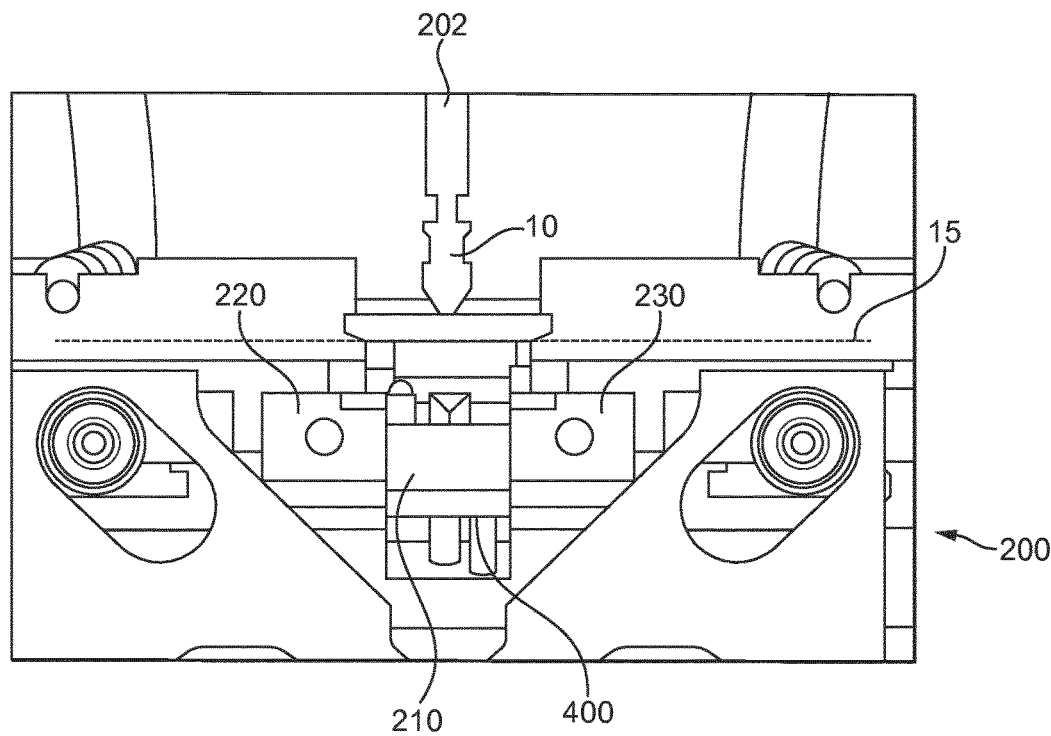
FIG. 1 shows a representative view of the position before sealing of the method for wrapping and sealing a flexible sheet over an insert to produce a pack for preparing a food or beverage product, according to the present invention.

According to the invention, a method for producing a pack 100 is disclosed: the pack comprises inside its volume at least one food or beverage ingredient for preparing a food or beverage product. The pack 100 comprises an insert 10 and a container 20: a fluid, typically water, is introduced inside the volume of the container at a certain velocity through an inlet 30 in order to typically mix and reconstitute the ingredient inside, preferably provided as a dehydrated product, typically powder. Once the product inside has been mixed and reconstituted, the final beverage or food product is dispensed through an outlet 40 arranged in the insert 10.

For reasons of hygiene, the container 20 in the pack 100 is made out of one flexible sheet 15 folded over it and also overwrapping the entirety of the insert 10 except for the part of this insert 10 which is in direct communication with the inner volume of the container 20. The invention discloses a method for wrapping the flexible sheet over the insert 10 so that the insert is arranged at the bottom side of the pack 100. After that, the flexible sheet 15 is tightly sealed over the entirety of the shape of the insert 10 with the exception of the part of this insert which is in direct communication with the inner volume of the container 20. The sealing is done in a tight manner and the sheet 15 matches the shape of the insert 10 overall, except for this inner part in communication with the inner volume of the container 20. Typically, when the insert 10 comprises a bottom side 11, two lateral sides 12, 13 and one inner side 14, the insert 10 is overwrapped and sealed with the flexible sheet 15 in it bottom and lateral sides 11 and 12, 13 respectively, leaving the inner side 14 free for the injection of water into the inner volume of the container 20 in order to be mixed and to reconstitute the ingredient or ingredients inside.

Once the insert 10 has been placed, wrapped and sealed with the flexible sheet 15, the bottom sealing 24, 25 and the side sealing 22, 23 take place in order to seal together the two folds of the flexible sheet 15 to configure the container 20. Then, the food or beverage ingredient or ingredients are introduced into the volume of the container 20, this container being at the end sealed on the top sealing 21 to close and configure the complete pack 100, ready for being used to prepare and dispense a beverage or food product.

The method of the invention therefore needs to provide a fast, automatic and reliable solution to be achieved in a forming filling sealing line where, compared to the classical standard sealing for packaging: the complexity of the method of the invention is to wrap the flexible sheet or film over the insert 10 and to seal typically in three sides, bottom and two lateral sides.

The method of the invention, in order to optimize the time and the cost of the equipment, achieves the above-mentioned tasks in one motion: the insert 10 moves down, the flexible sheet 15 is pinched between the insert 10 and a bottom sealing tool 210; the moving down is continuous and simultaneous to the moving of at least two side sealing tools 220, 230 towards the insert 10 and up to applying the necessary pressure and temperature to achieve a tight sealing. Advantageously, the invention only needs one unit to wrap and seal the insert, so the machine size and costs are optimised.

The purpose of the method of the invention is to reduce the risk of leakage between the laminated film (flexible sheet 15) and the insert 10. In the method of the invention, the design of sealing means 250 and their relative positioning with respect to the insert 10 has to be very precise and is of high importance for the method of the invention. The sealing means 250 typically comprise a bottom sealing tool 210 and two side sealing tools 220, 230. Moreover, the shape of the sealing means 250 needs to be very precise in order to be able to evenly distribute the pressure over all the surface of the insert 10. This will further allow the correct sealing of the flexible sheet 15 over the insert 10 so that no bubbles nor creases or wrinkles exist.

Figure 2:
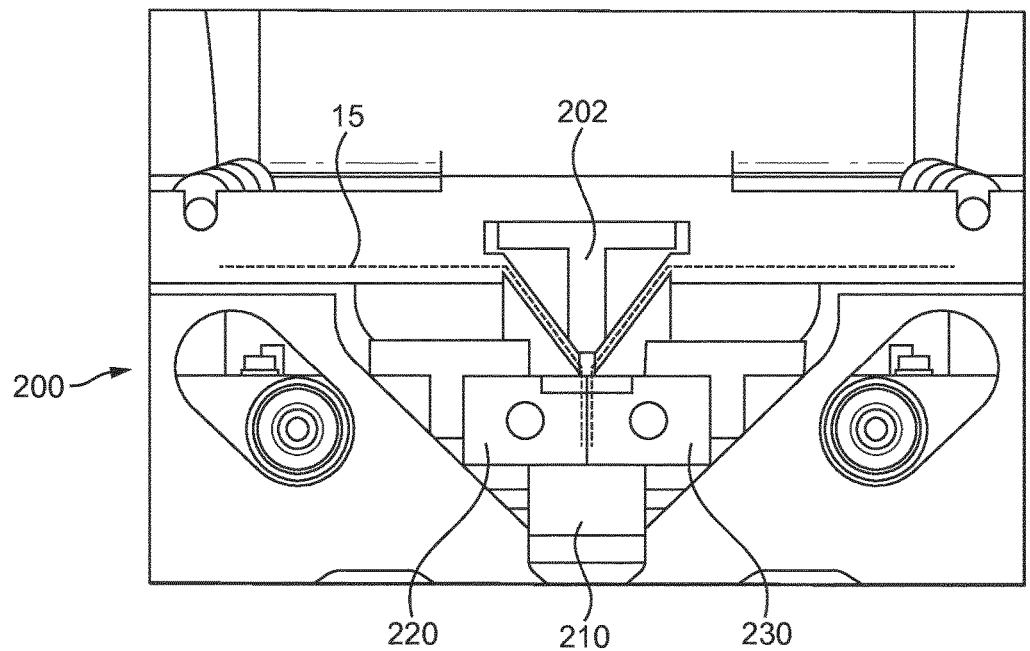
FIG. 2 shows a representative view of the position during sealing of the method for wrapping and sealing a flexible sheet over an insert to produce a pack for preparing a food or beverage product, according to the present invention.
Figure 3:
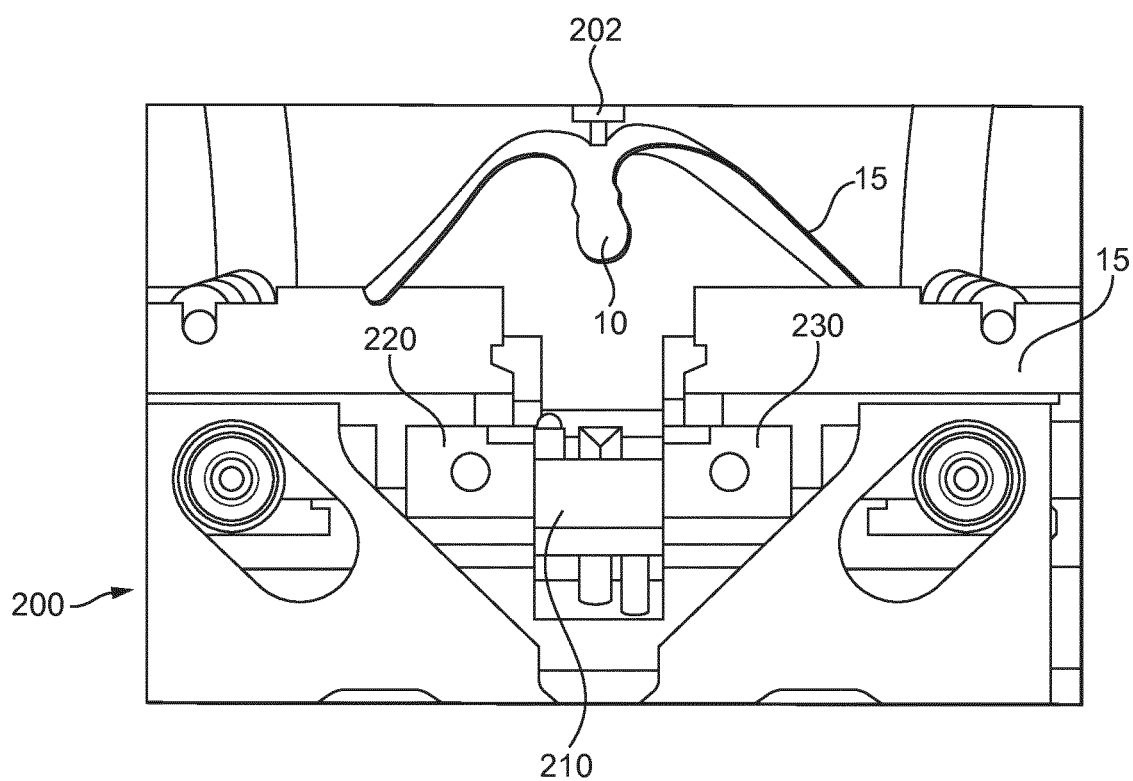
FIG. 3 shows a representative view of the position after sealing of the method for wrapping and sealing a flexible sheet over an insert to produce a pack for preparing a food or beverage product, according to the present invention.

As it can be seen for example in FIG. 1, 2 or 3, the different steps of the method for wrapping and sealing a flexible sheet over an insert to produce a pack for preparing a food or beverage according to the invention are represented. Firstly, the insert 10 is held preferably vertically by an insert support 202, substantially perpendicular with respect to the flexible sheet 15, as shown in FIG. 1. The insert 10 is held substantially transversally, the side sealing tools 220, 230 facing both longitudinal sides of the insert 10. The insert 10 is then moved downwards, substantially vertically, by the insert support 202, and displaces downwards the flexible sheet 15 with its movement so that this film is folded over the insert 10 as shown in FIG. 2; a synchronized movement of the sealing means 250 takes place, between the positions shown in FIG. 1 (position before sealing) and in FIG. 2 (position during sealing): while the bottom sealing tool 210 moves downwards until it reaches a stop 400, the side sealing tools 220 and 230 approach to each other until their inner faces touch and they leave inside the insert 10. Once the sealing means 250 have reached the position shown in FIG. 2, sealing of the flexible sheet 15 over the insert 10 can then start, by the application of pressure and temperature during a certain period of time of the side sealing tools 220 and 230 and of the bottom sealing tool 210. As represented in FIG. 3, once the sealing of the film (flexible sheet 15) and the insert 10 takes place, the insert support 202 removes the film and the insert, the sealing means 250 returning to their original position before sealing as shown in FIG. 1.

Later, the sealing of the flexible sheet folded at the bottom and side parts takes place in order to conform the container 20. The ingredient or ingredients are introduced in the inner volume of the container and then the pack is closed by being sealed on the top part.

According to a second aspect, the invention further refers to a device 200 for wrapping and sealing a flexible sheet 15 over an insert 10 to produce a pack 100 as the one previously described. The device 200 comprises film guiding means 201 configured to position the flexible sheet 15 substantially perpendicular with respect to the insert 10 and allow the displacement of the film downwards by the insert 10 moving vertically down: typically, the guiding means 201 comprise a pair of guiding plates 203, 204 allowing the sliding of the film guiding it by two sides so that it is wrapped over the bottom side 11 and the lateral sides 12, 13 of the insert 10 as the insert moves down. By a correct guiding of the film, a tight positioning of it over the insert is allowed so a later tight sealing is achieved, avoiding wrinkles, creases or the like.

The device 200 further comprises sealing means 250, typically comprising a bottom sealing tool 210 and side sealing tools 220, 230 configured to have complementary shapes to the shapes of the insert 10 in its entirety except for the part of the insert in direct communication with the inner volume of the container 20, typically sealing the bottom side 11 and the lateral sides 12, 13 of the insert and leaving free the inner side 14 of the insert. These sealing means 250 are configured to apply certain required pressure and temperature values during a certain time (as a function typically of the dimensions of the insert, thickness of the flexible sheet 15 and material of the insert and the film, amongst others, to achieve a tight sealing of the flexible sheet 15 over the insert 10.

In the device 200 of the invention, the film guiding means 201 and the sealing means 250 are synchronized in such a way that, as the insert 10 moves downwards and is wrapped by the flexible sheet 15, the sealing means 250 come to seal tightly the insert.

Figure 4:
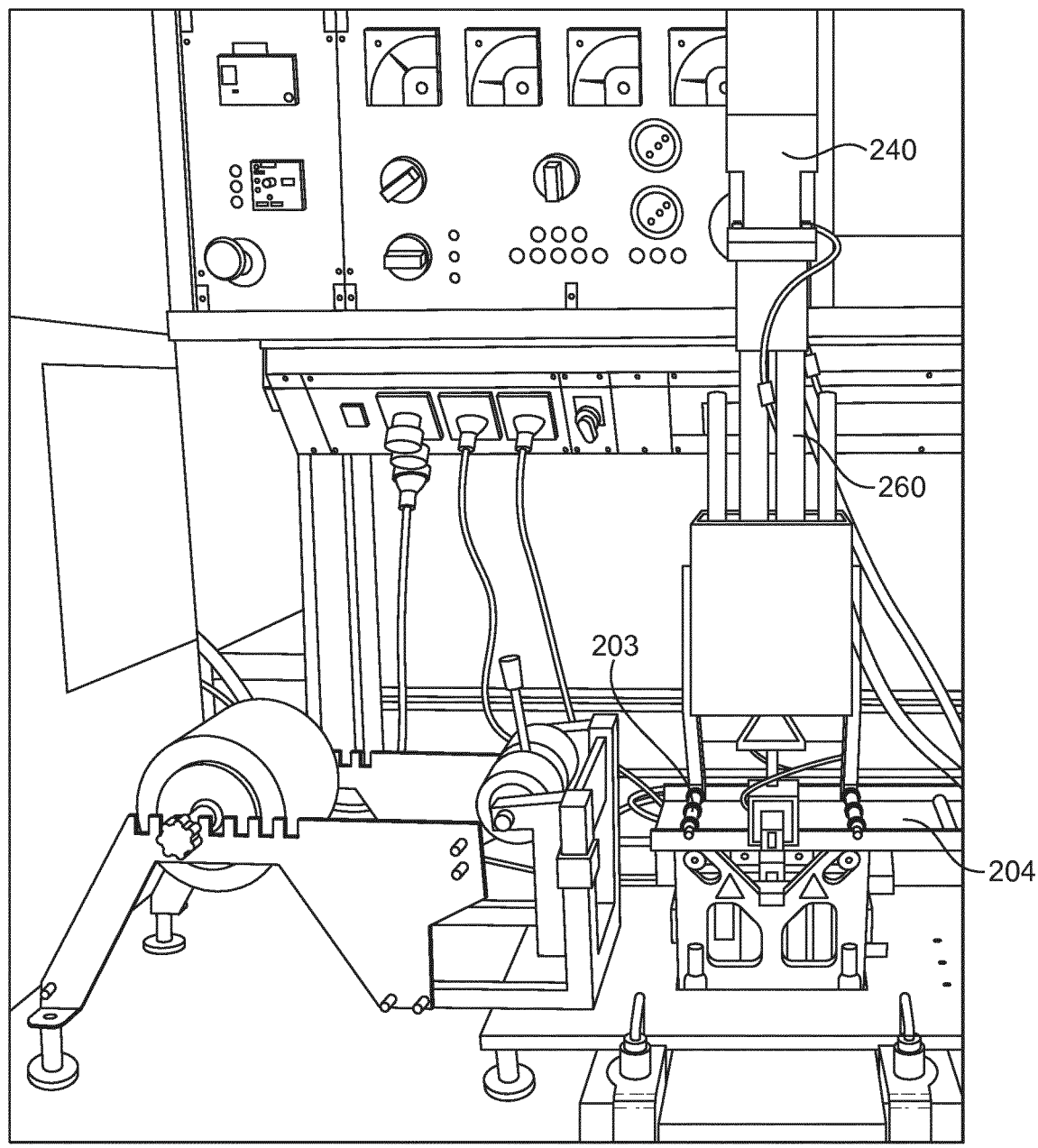
FIG. 4 shows a representative view of a device for wrapping and sealing a flexible sheet over an insert to produce a pack for preparing a food or beverage product, according to the present invention.
Figure 5:
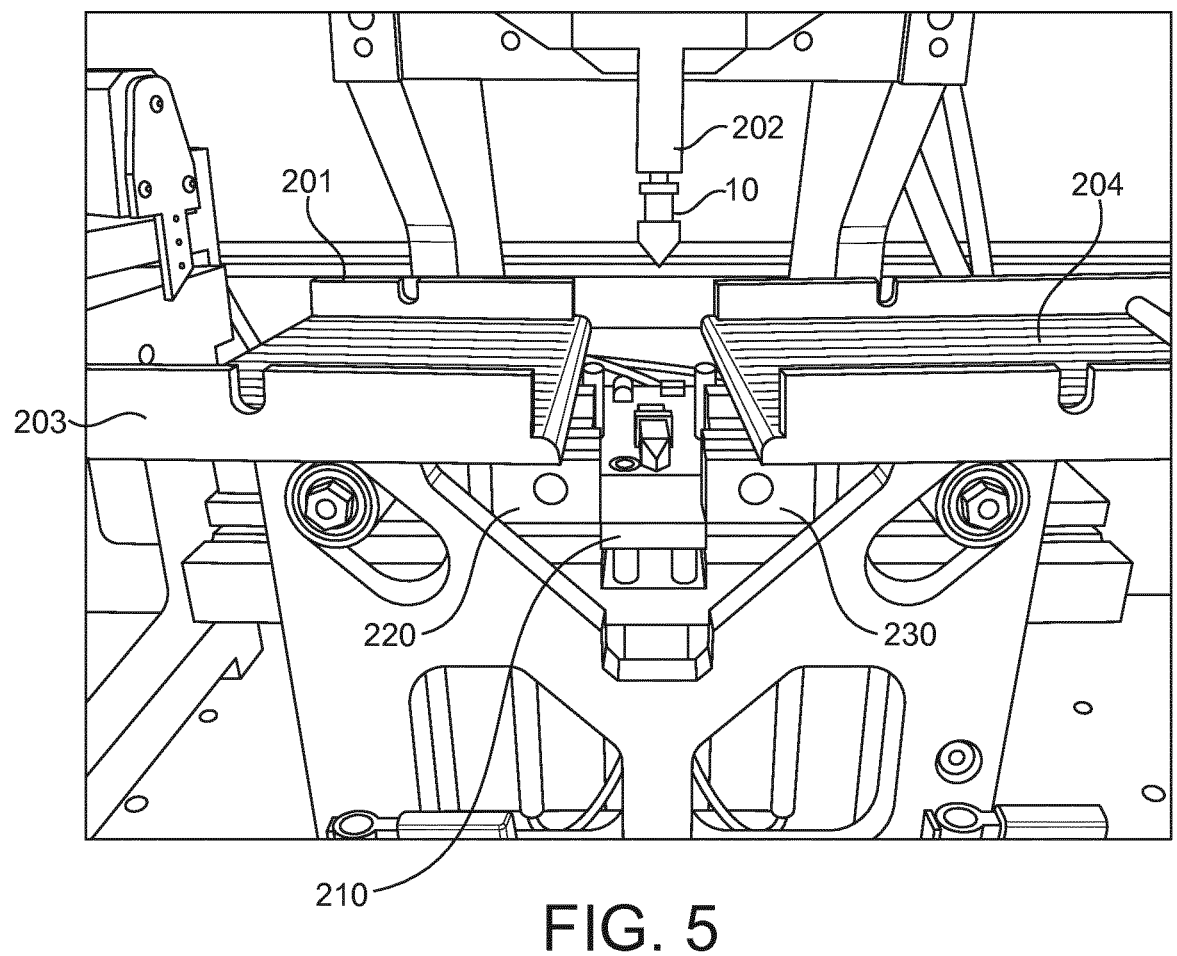
FIG. 5 shows a representative view of the device for wrapping and sealing a flexible sheet over an insert to produce a pack for preparing a food or beverage product, according to the present invention, showing the insert support and the guiding means.
Figure 6:
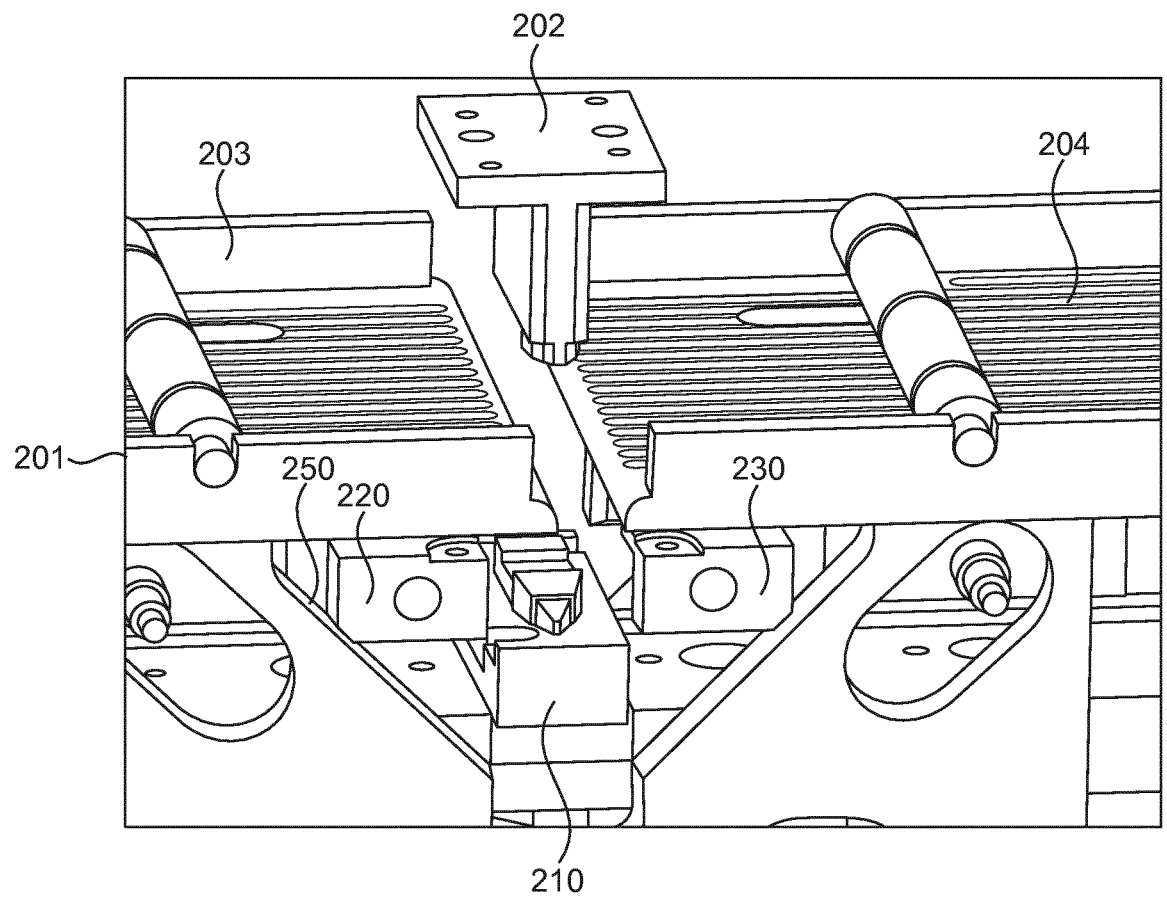
FIG. 6 shows a representative view of the device for wrapping and sealing a flexible sheet over an insert to produce a pack for preparing a food or beverage product, according to the present invention, showing the sealing means.
Figure 7:
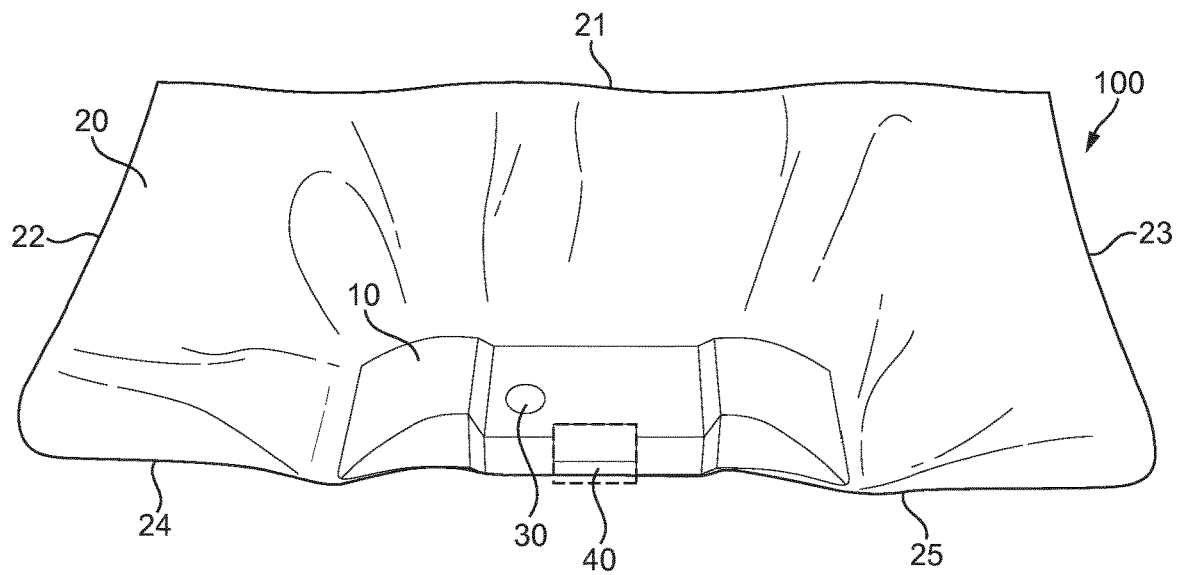
FIG. 7 shows a representative view of a pack for preparing a food or beverage product, used in a device and method according to the present invention.
Figure 8:
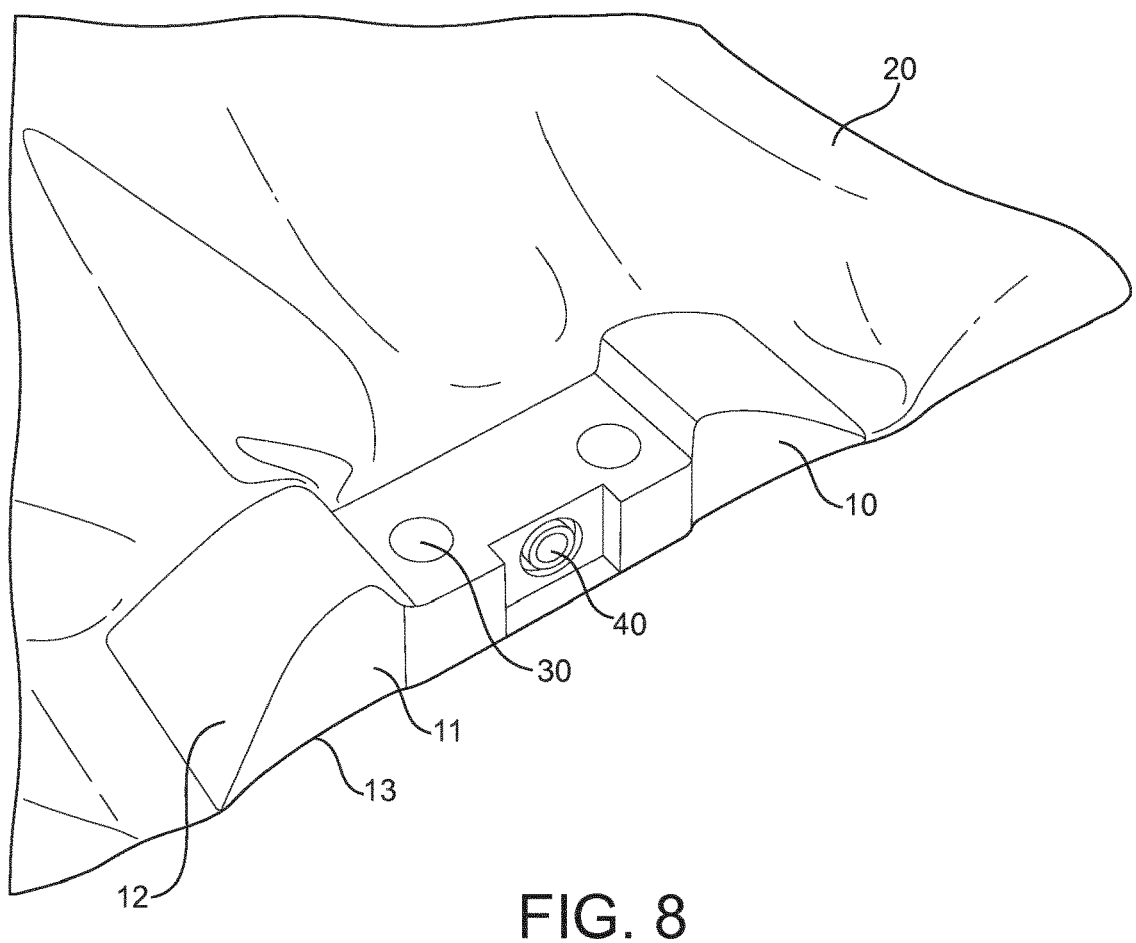
FIG. 8 shows a representative view of an insert in a pack for preparing a food or beverage product, used in a device and method according to the present invention.

Typically, the device 200 of the invention further comprises an insert support 202 configured to hold the insert 10 in a substantially vertical position, and guiding it downwards substantially vertically to be wrapped around the flexible sheet. Also, the device 200 typically comprises, as shown in FIG. 4, an electrical thrust cylinder coupled to a guiding unit 260 for actuating the insert support 202 and moving the insert 10 towards the flexible sheet 15.

In order to implement the device and method of the invention efficiently, the device is configured as a single unit, operating in an automatic way, able to effect the wrapping and sealing of the flexible sheet 15 over the insert 10 in a quick and reliable way. The device 200 is configured by the design of the sealing means 250 (bottom sealing tool 210 and side sealing tools 220, 230) and their relative positioning with respect to the insert 10.

In the device 200 of the invention, the sealing means 250 are typically configured having a substantially constant distance in any of their transversal directions along their longitudinal axis, also matching with the same configuration of the insert 10. This allows the correct folding of the flexible sheet 15 over the sides and bottom parts of the insert 10, further obtaining a tight sealing, avoiding wrinkles, creases or the like, thus an optimal sealing is achieved by the device of the invention.

Although the present invention has been described with reference to preferred embodiments thereof, many modifications and alternations may be made by a person having ordinary skill in the art without departing from the scope of this invention which is defined by the appended claims.

The invention claimed is:

1. A method for wrapping and sealing a flexible sheet over an insert to produce a pack for preparing a food or beverage product from one or more ingredients;

the pack comprising an insert and a container made from the flexible sheet folded to store the one or more ingredients, the flexible sheet being arranged overwrapping and matching the shape of the insert in its entirety except for a part of the insert in direct communication with an inner volume of the container;

the method comprising the following steps:

holding the insert so that it is substantially perpendicular with respect to the flexible sheet;

moving the insert towards the flexible sheet, until the insert touches a bottom sealing tool;

moving at least two side sealing tools towards the insert; and applying by the bottom sealing tool and by the side sealing tools a certain required pressure and temperature to achieve a tight sealing of the flexible sheet over the entirety of the insert except for the part of the insert in direct communication with the inner volume of the container.

2. The method for wrapping and sealing the flexible sheet over the insert according to claim 1, wherein the sealing parameters are one or a combination of: time and/or pressure and/or temperature.

3. The method for wrapping and sealing the flexible sheet over the insert according to claim 1, wherein the insert is held substantially transversally, the side sealing tools facing both longitudinal sides of the insert.

4. The method for wrapping and sealing the flexible sheet over the insert according to claim 1, comprising the step of closing the ends of the flexible sheet by application of pressure and temperature in order to form a closed container inside the volume of which the ingredients are stored.

5. A device for wrapping and sealing a flexible sheet over an insert to produce a pack for preparing a food or beverage product from one or more ingredients, the pack comprising an insert and a container made from the flexible sheet folded to store the one or more ingredients, the device comprising:
   a film guiding member configured to position the flexible sheet substantially perpendicular with respect to the insert;
   a sealer configured to have complementary shapes to the shapes of the insert in its entirety except for a part of the insert in direct communication with an inner volume of the container, the sealer being further configured to apply certain required pressure and temperature values to achieve a tight sealing of the flexible sheet over the insert in its entirety except for the part in direct communication with the inner volume of the container, the sealer comprising a bottom sealing tool and at least two lateral sealing tools; and
   an insert support configured to guide the insert downwards to be wrapped around the flexible sheet prior to arriving at the sealer.

6. The evice according to claim 5 wherein the film guiding member and the sealer are synchronized in such a way that, as the insert moves downwards and is wrapped by the flexible sheet, the sealer come to seal tightly the insert in its entirety except for the part of it in direct communication with the inner volume of the container.

7. The evice according to claim 5 wherein the insert support is configured to hold the insert in a substantially vertical position, and guide it substantially vertically to be wrapped around the flexible sheet.

8. The evice according to claim 5 configured as a single unit, operating in an automatic way.

9. The evice according to claim 5 wherein the sealer is configured to evenly distribute pressure over the surface of the insert.

10. The evice according to claim 5 wherein the lateral sealing tools are configured to maintain a substantially constant distance when moving toward the insert.

* * * * *